April 11, 1933.   W. N. BOOTH   1,903,567
VEHICLE WHEEL
Filed Jan. 21, 1927   2 Sheets-Sheet 1
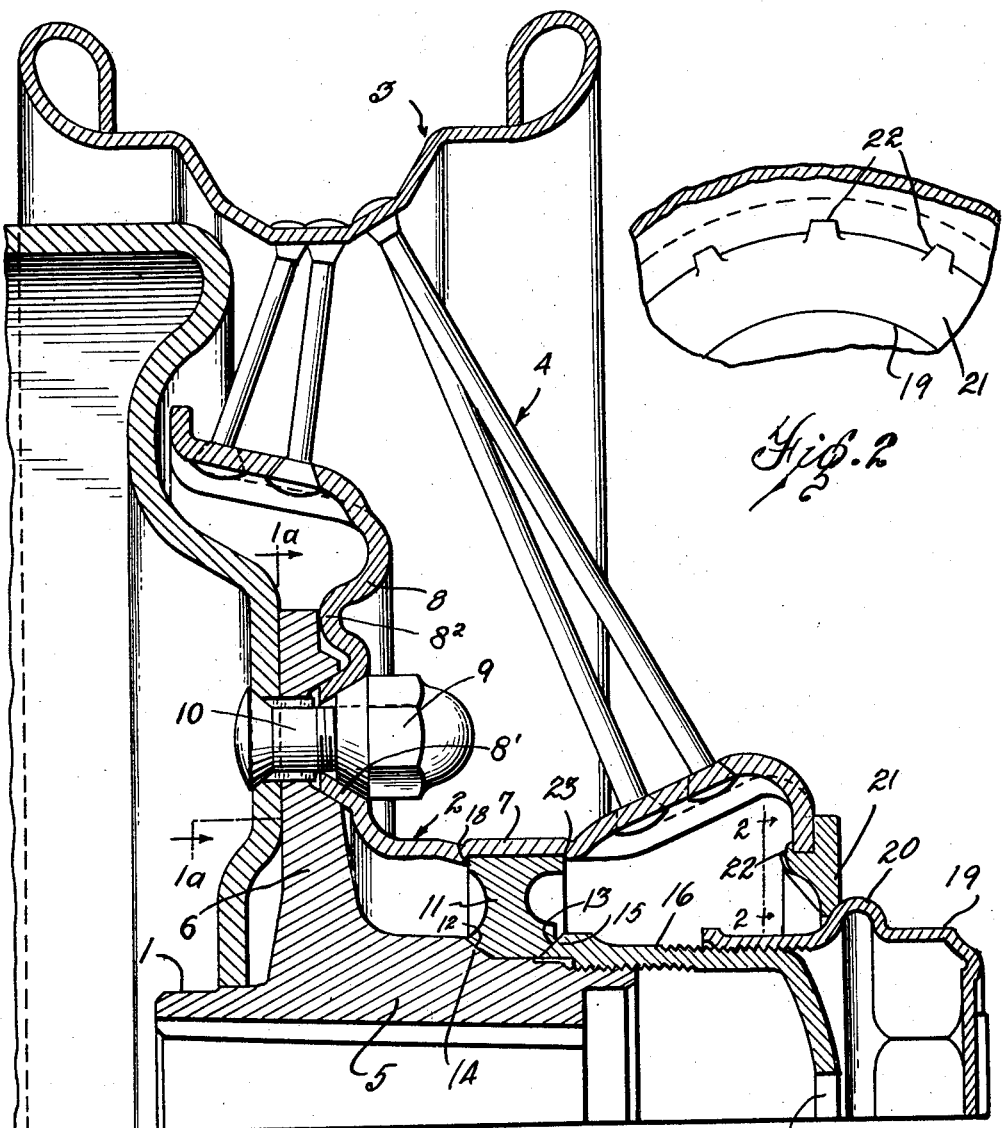
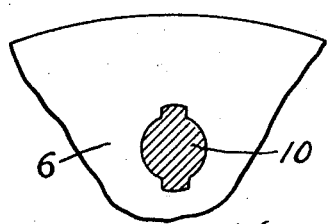
INVENTOR.
WILLIAM N. BOOTH,
BY
ATTORNEYS April 11, 1933.   W. N. BOOTH   1,903,567
VEHICLE WHEEL
Filed Jan. 21, 1927   2 Sheets-Sheet 2
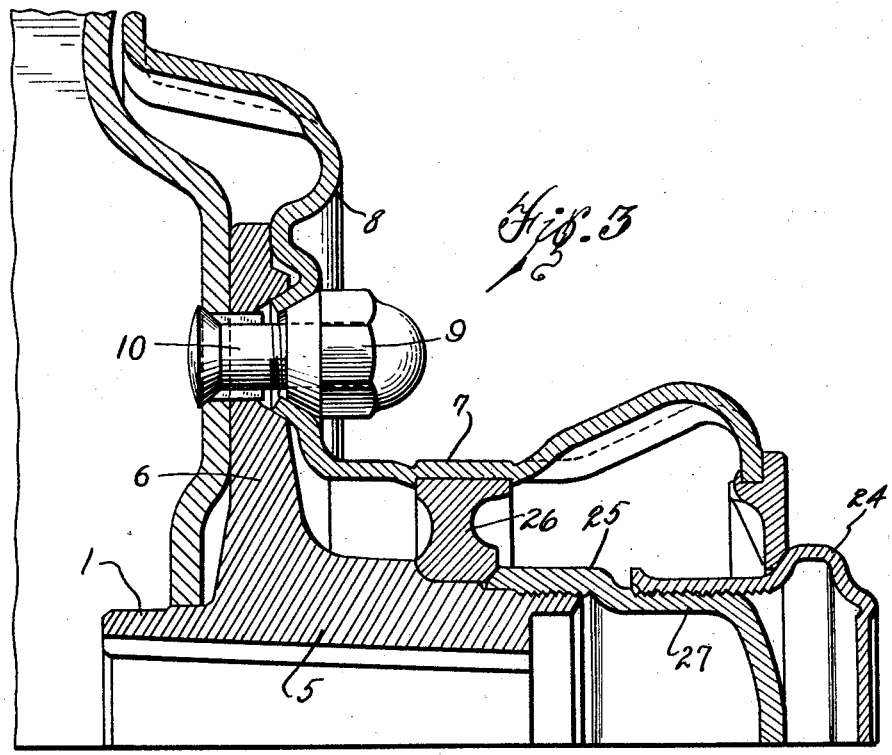
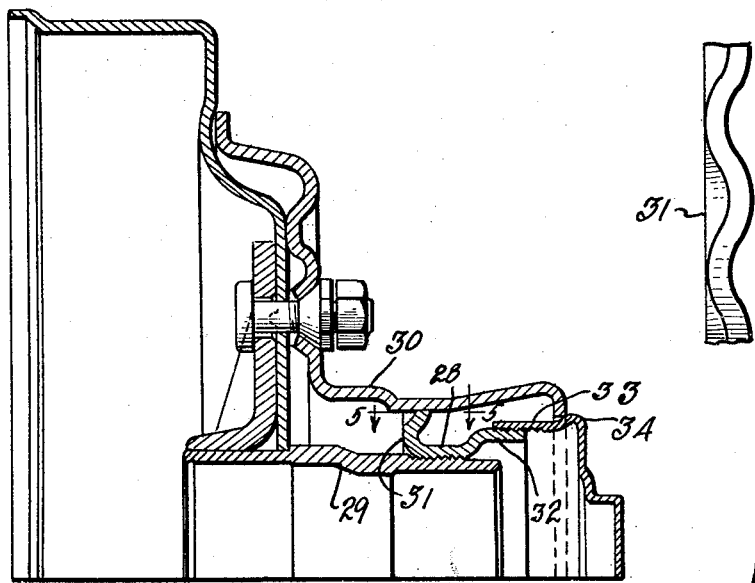
INVENTOR.
WILLIAM N. BOOTH
BY
ATTORNEYS Patented Apr. 11, 1933

1,903,567

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed January 21, 1927. Serial No. 162,653.

The invention relates to vehicle wheels and refers more particularly to wire wheels. One of the objects of the invention is the provision in a wheel of that type having a hub and a hub shell of a spacer between the hub and hub shell to provide for decreasing the size and also the cost of manufacture of the hub. Another object is to provide for holding the hub shell upon the hub by the spacer. A further object is to provide means for locking the spacer upon the hub. With these as well as other objects in view, the invention resides in the novel features of construction and combinations and arrangements of parts as more fully hereinafter set forth.

In the drawings:—

Figure 1 is a transverse section through a vehicle wheel embodying my invention;

Figures 1ª and 2 are cross sections respectively on the lines 1ª—1ª and 2—2 of Figure 1;

Figures 3 and 4 are views similar to Figure 1 showing modified constructions;

Figure 5 is a cross section on the line 5—5 of Figure 4.

The vehicle wheel shown in the drawings is a wire wheel comprising a wheel body and a hub so arranged that the wheel body may be applied to or removed from the hub.

The wire wheel shown in Figures 1 and 2 is a rear wheel in which 1 is the hub and 2 the hub shell forming part of the wheel body and connected to the rim 3 by the spokes 4. The hub 1 has the barrel 5 and the fixed flange 6 while the hub shell 2 has the barrel 7 and the outwardly extending flange 8. The barrel 5 is of reduced size to reduce the cost of manufacture of the hub and is concentric with and spaced from the barrel 7. The hub shell is preferably secured to the hub by means of the nuts 9 and bolts 10, the latter extending freely through the web of the brake drum if used, the fixed flange 6 and the outwardly extending flange 8 for limited angular movement relative thereto but being suitably held from rotation relative thereto as by means of fins engaging in channels formed in the fixed flange. For driving the hub shell with the hub, the former is provided with the frusto-conical projections 8' which are in the nature of flanges pressed into the outwardly extending flange and the fixed flange is provided in its front face with correspondingly shaped recesses for receiving the frusto-conical projections. The nuts have frusto-conical faces for engaging the inner faces of the frusto-conical projections. With this arrangement the bolts and nuts secure the hub shell to the hub while the frusto-conical projections and recesses effect the driving.

For spacing the hub barrel 5 and hub shell barrel 7 from each other, I have provided the annular spacer 11, the inner face of which is slidably engageable with the hub barrel and the outer face of which preferably has a press fit with the hub shell barrel. The hub barrel is provided with the annular bevelled shoulder 14 for engaging a correspondingly bevelled shoulder 12 upon the inner rear corner of the spacer and thereby limiting the movement of this spacer during the assembly of the wheel body upon the hub. The front inner corner of the spacer is provided with a bevelled shoulder 13 for engagement with the bevelled nose 15 upon the nut 16 which latter is internally threaded to engage external threads upon the front end of the hub barrel 5. This nut is also provided in its end with the polygonal opening 17 for engagement by a suitable tool such as a socket wrench. The spacer is held from longitudinal movement relative to the hub shell by forming the inwardly extending shoulders 18 and 23 upon the hub shell barrel, the shoulder 18 being formed preferably by punching the metal of the hub shell inwardly at spaced peripheral points and the shoulder 23 being formed preferably by rolling the metal of the hub shell barrel inwardly. These shoulders embrace the spacer at its outer edge with the shoulders 18 being formed at the outer rear corner and the shoulder 23 at the outer front corner.

The hub shell is preferably formed of sheet metal and the shoulders 12 and 14 are so located with respect to the annular rib 8ª upon the outwardly extending flange 8 that when the former are in engagement the latter is spaced from the fixed flange 6. As a consequence, tightening of the nuts 9 upon the bolts 10 first bring the shoulders 12 and 14 into contact and then bring the annular rib 8² and the fixed flange 6 into contact, during which the outwardly extending flange 8 is flexed to increase the tension of the spokes 4. The frusto-conical projections 8' are formed in the outwardly extending flange 8 so that before the nuts have been completely tightened down upon the bolts and when the annular rib and fixed flange are in contact these frusto-conical projections are slightly spaced from the walls of the recesses in the fixed flange. As a consequence, it will be seen that these frusto-conical projections when forced into contact with the walls of the recesses function, owing to the resiliency of the metal, to lock the nuts upon the bolts.

For locking the nut 16 upon the hub shell, I have provided the hub cap 19 which is threaded upon the nut and frictionally engages the hub shell. As shown, this hub cap has the annular bead 20 for engaging the annular abutment member 21, the latter being rigidly secured to the end of the hub shell barrel as by peening over the portions 22 of the abutment member.

In the modification shown in Figure 3, the wheel has the same general arrangement of parts with the exception that provision is made for using a standard hub cap 24. To use this standard hub cap the nut 25 for securing the spacer 26 in place has its end portion 27 reduced in diameter so that the external threads upon this reduced end portion will fit the internal threads upon the hub cap.

In the modification shown in Figures 4 and 5, a sheet metal spacer 28 is used between the barrels of the hub 29 and hub shell 30. This spacer has a central portion which is internally threaded to engage external threads upon the end of the hub barrel and an annular flange portion 31 which is corrugated and has the end of its corrugations abutting the inner face of the hub shell barrel. The spacer also has the cylindrical portion 32 of greater diameter than the central portion 28 and externally threaded for engagement by the hub cap 33. This hub cap has the annular bead 34 for frictionally engaging the front end of the hub shell barrel.

What I claim as my invention is:

1. In a vehicle wheel, the combination with a hub having a barrel, of a hub shell having a barrel spaced from said hub barrel and provided with an inwardly extending shoulder and an abutment member secured to an end of said barrel, a spacer between said barrels for supporting the one from the other, means threadedly engaging said hub barrel and abutting said spacer to hold said spacer and hub shell in fixed relation to said hub, and means threadedly engaging said first mentioned means and frictionally engaging said abutment member to lock said first mentioned means upon said hub.

2. In a vehicle wheel, the combination with a hub having a barrel, of a hub shell having a barrel spaced from said hub barrel, a spacer between said barrels for supporting the one from the other, a shoulder upon said hub shell barrel engaged by the rear face of said spacer, a standard hub cap extending within said hub shell barrel, and a nut threaded upon said hub barrel and abutting said spacer, said nut having a reduced externally threaded portion for engagement by said standard hub cap.

In testimony whereof I affix my signature.

WILLIAM N. BOOTH.